Aug. 11, 1931.  H. C. WALLACE  1,818,367
GRAIN CLEANER
Filed Jan. 31, 1927    2 Sheets-Sheet 1
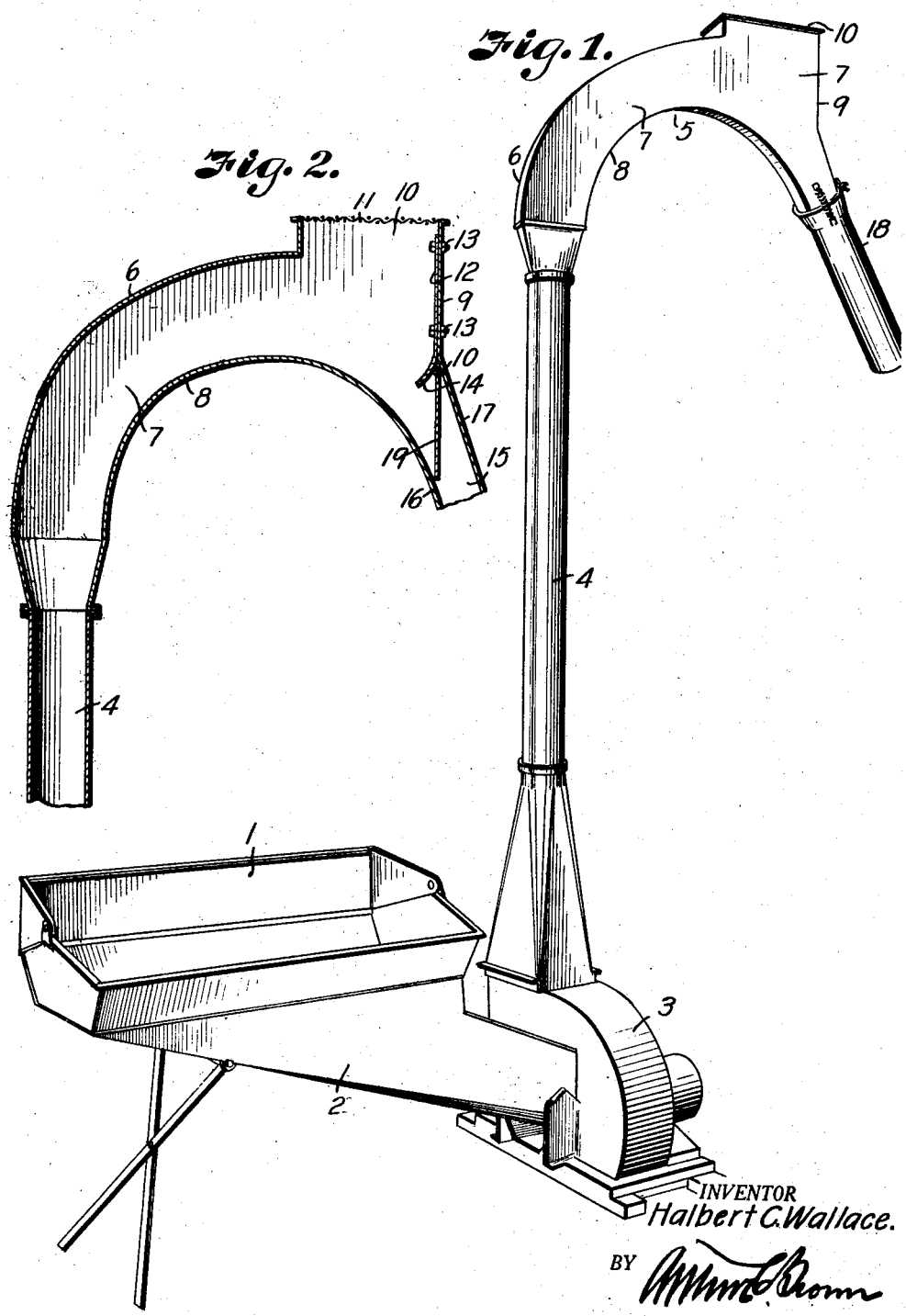
INVENTOR
Halbert C. Wallace.
BY
ATTORNEY Aug. 11, 1931.  H. C. WALLACE  1,818,367
GRAIN CLEANER
Filed Jan. 31, 1927  2 Sheets-Sheet 2

INVENTOR
Halbert C. Wallace.
BY
ATTORNEY

Patented Aug. 11, 1931

1,818,367

UNITED STATES PATENT OFFICE

HALBERT C. WALLACE, OF KANSAS CITY, MISSOURI

GRAIN CLEANER

Application filed January 31, 1927. Serial No. 164,713.

My invention relates to grain cleaners and more particularly to air-blast operated cleaners.

My object is to provide a device operable by an air blast that will receive the trashy grain and deliver the cleaned grain without the necessity for interposition of any moving parts requiring extraneous actuation. I provide a grain cleaner comprising a blower creating a flow of air that elevates the grain to a goose-neck chamber and there directs the grain laterally and discharges it against a baffle plate where the grain is retained momentarily and from which it falls by gravity through a grain discharge chute, the air flow or blast having egress for the carrying away of dust, straw and other extraneous materials at other openings provided. The structure by which these and other functions are provided for will be more particularly described with references to the drawings in which:

Fig. 1 is a perspective view of a grain blower and cleaner embodying a preferred form of my invention.

Fig. 2 is an enlarged detail sectional view through the cleaner.

Figure 3:
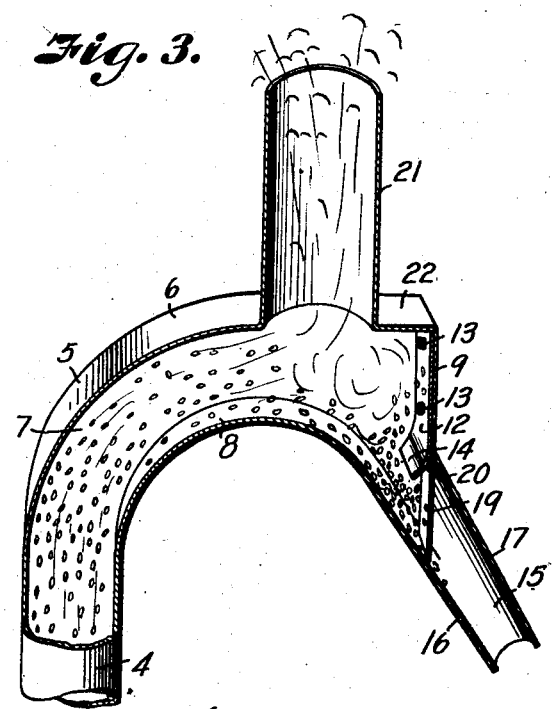
Fig. 3 is a similar sectional view through a slightly modified form of the invention.

Referring more in detail to the drawings:

1 designates a hopper for reception of grain to be conducted by a chute 2 into a blower 3 for pneumatic propulsion through a vertical pipe 4 into the goose-neck curved cleaner head 5 in which features of my invention are incorporated.

The cleaner head 5 comprises in my preferred form a casing having an upper curved wall 6 that directs the air blast into a horizontal direction as restrained by vertical side walls 7, the lower wall 8 retaining the blast and having other functions later to be detailed, and a vertical end wall 9 against which the blast impels the grain. The end wall checks and largely nullifies the force of the blast so that while it tends to hold the grain against the wall, only a small portion of its energy is available for disturbance of the materials and movement thereof into other directions. A sufficient degree of the air blast continues to operate, however, to carry dust and small seeds out of the cleaner head through an opening, shown in the preferred form as a vertical opening 10 provided with a screen 11 that is designed to intercept the kernels of the grain being cleaned and prevent their egress through said opening. A baffle plate 12 is removably fixed to the face of the end wall by bolts 13, to receive the impact of the grain-laden air blast and endure the incident wear, and having a retractively curved lower portion 14 whereby the air blast is given an upward tendency and is prevented from partial egress through the grain outlet throat 15. The said throat 15 is formed in this instance by a downwardly extended portion 16 of the lower wall 8 and an angularly extended depending wing 17 of the end wall 9, said vertical sides here also serving to close the throat portion of the cleaner head. The grain projected against the protected end wall by the blast, and momentarily detained there, has weight to fall into the throat and is conducted away by a chute 18 to a receiver not shown. Within the throat is positioned a swinging door 19 pivoted in the side walls as at 20, vertically aligned with the end wall and by construction intercepting and normally contacting the inner surface of the extension 16 of the lower wall 8 of the cleaner head, to close the throat against air currents that may be induced inwardly of the cleaner head through the throat by the influence of the blast. The cleaned grain falling from the end wall is deposited on the lower wall extension and against the door, and its weight causes the opening of the door for its passage by gravity into the chute.

I may also provide a pipe or chimney 21, Fig. 3, fixed on the cleaner head annularly of the opening 10, in which case a horizontal extension 22 of the upper wall 6 joining the end wall 9 is provided and the screen may be modified or dispensed with. The variant structure is an adaptation whereby straws and other lighter materials are expelled through the top opening as well as dust and small seeds, the said upper wall extension trapping grain kernels to prevent their upward expulsion.

Figure 4:
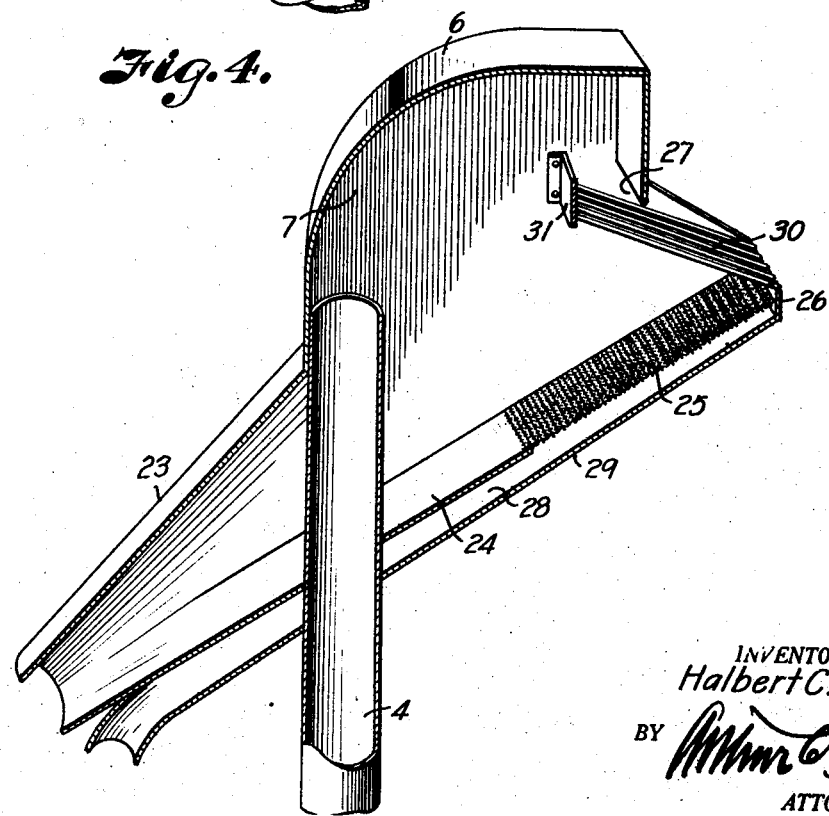
Fig. 4 is a sectional view through a form modified for association with seed separation elements.

The modification shown in Fig. 4 illustrates an adaptation to grain separation, and provides also for expulsion of straws and small sticks, the upper wall and baffling end wall construction being similar to that of my preferred form but the openings and the lower wall being differently disposed to accommodate the accessory elements as will be described. In this case the cleaner head is provided with an anterior outlet 23, the floor 24 of which slopes downwardly from the interior of the head and has a perforate screen extension 25 projecting beyond the vertical plane of the end wall for the reception of seeds and grain kernels falling from the end wall after propulsion thereagainst by the air blast. The floor and screen extension are supported at the outer end by engagement with a vertical end plate 26 and with the side walls 7 of the head that are understood to close the sides of all portions of the casing. The upper horizontal edge of the end plate 26 is spaced from the lower edge of the end wall both vertically and horizontally, thus providing an opening 27 for egress of the air blast and of the light materials it carries.

Positioned below the floor 24 and adjacent thereto and having a similar shape is a race 28 that constitutes the bottom of a chute 29 for reception of small seeds and heavier particles falling with grain kernels from the end wall and passing through the screen 25, and for conducting the said small seeds and particles to a suitable receiver. An additional cleaning element is provided in the form of a bar screen 30 positioned between the end wall and the perforate screen, the bars being disposed parallel and sloping downwardly and outwardly through the opening 27, being supported outwardly by the end plate 26 and inwardly by brackets 32 attached to the side walls. In this case there is no top opening in the cleaner head, the air blast, projecting the uncleaned grain against the end wall as elsewhere shown, tending to parallelize sticks and straws thereagainst which fall upon the bar screen 30 and are detained there for propulsion outwardly through the opening by the air blast. The air blast, partly nullified by impact against the end wall, exerts some influence downwardly, but has an even greater influence through the portions that bear upwardly through the bar screen and dislodge straw from said bar screen and carry it outwardly, keeping said screen free for the passage of grain kernels.

What I claim and desire to secure by Letters Patent is:

1. In a grain cleaning device, a conduit including a curved portion and having a vertical wall to receive grain carried by air currents through said curved portion, said conduit also having an upwardly opening air outlet adjacent said vertical wall, a grain discharge throat including a downward outwardly inclined extension of said vertical wall, and a baffle supported by said vertical wall and having its lower end curved inwardly across said throat to divert said air currents into a curved path for departure through said air outlet.

2. In a grain cleaner, a head including an upper wall including an upwardly outwardly curved portion and a horizontally extending outer end portion provided with an opening, a lower wall extending across said opening including an upwardly outwardly curved portion and a downwardly curved portion, and an end wall depending from the outer end of said upper wall having a curved lower end having a lower edge spaced from said downwardly curved portion of the lower wall and adapted to divert air laterally against said portion for upward movement toward said opening.

3. In a grain cleaner, a head having an outlet opening and including an upper wall including an upwardly outwardly curved portion and a horizontal outer end portion for diverting air currents from a vertical to a horizontal path, a vertical wall depending from the outer end of said horizontal portion in the path of horizontally diverted air currents, and a lower wall extending beneath the upwardly outwardly curved portion of the upper wall to form the bottom wall of the head and including an inclined portion extending in vertically spaced relation with the lower edge of said vertical wall to form a second outlet opening and projecting outwardly beyond the same.

In testimony whereof I affix my signature.

HALBERT C. WALLACE.